Jan. 8, 1935.　　　　H. O. SIEGMUND　　　1,987,420
ELECTROLYTIC DEVICE
Filed Nov. 5, 1929
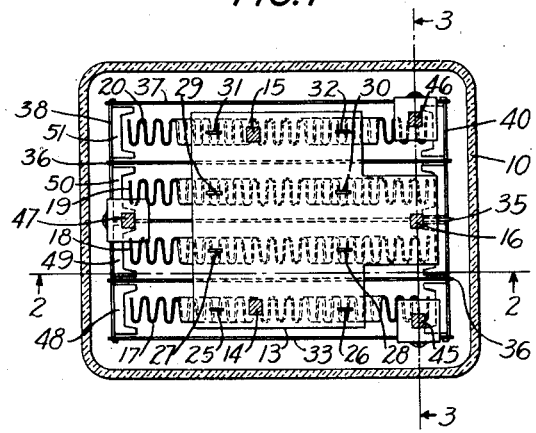
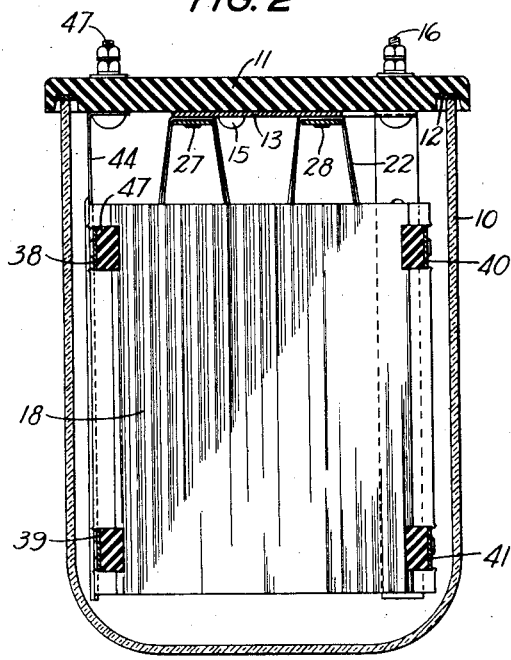
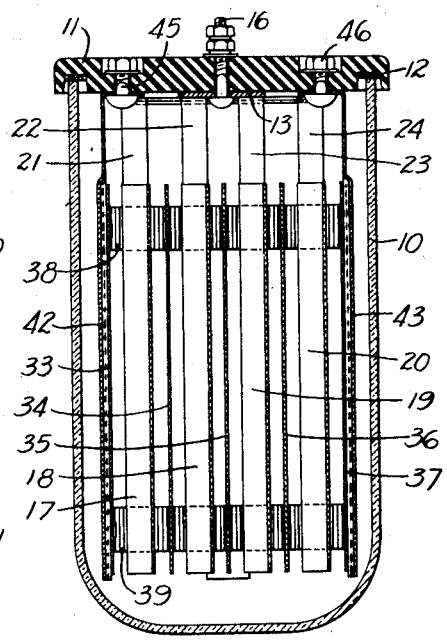
INVENTOR
H. O. SIEGMUND
BY
ATTORNEY Patented Jan. 8, 1935

1,987,420

UNITED STATES PATENT OFFICE 1,987,420

ELECTROLYTIC DEVICE

Humphreys O. Siegmund, West Orange, N. J., assignor to Bell Telephone Laboratories, Incorporated, New York, N. Y., a corporation of New York Application November 5, 1929, Serial No. 404,906

6 Claims. (Cl. 175—315)

This invention relates to electrolytic devices such as electrolytic condensers and particularly to the plate assembly employed therein.

One form of electrolytic condenser now in general use is composed of a number of thin electrode plates arranged in side-by-side relation, the alternate electrodes being suspended in an electrolyte from common supporting members which rest on top of the container. In such devices the positive electrodes are subject to corrosion which is accompanied by a deposit of granular substance on the bottom of the cell. The corrosion which takes place on that portion of the plate which is immersed in the electrolyte does not seriously affect the electrical properties of the condenser since such corroded areas have a tendency to heal up and restore the plate to its normal efficiency. However, the supporting member, to which the positive plates are attached, does not have this tendency to heal up where the member emerges from the electrolyte. Hence, in a relatively short time these members may become corroded to the extent that the positive plates attached thereto drop into the cell and cause short circuits by coming into contact with the negative plate assembly. Furthermore, the corrosion product may soon accumulate between plates on the bottom of the cell to the extent that it forces plates of different potential together, thus causing short circuits within the cell. Heretofore, it has been customary in some cases to prevent these short circuits by inserting a plurality of insulating spacing members between the plates and in contact therewith. These, however, are not entirely satisfactory since it has been found that the plates do not heal up at the areas where the spacing members are in contact with the face of the positive plates.

In accordance with a feature of this invention, insulated spacing members are fastened to the negative plate assembly upon which even in the presence of a strong electrolyte, they do not cause corrosion. They are designed so that the positive plates do not touch them when in their normal position. In the event, however, that one of the supporting members to which a positive plate is attached becomes corroded to the extent that the plate drops into the cell, the insulators attached to the adjacent negative plate assembly will maintain the fallen plate in a semi-vertical position, thus preventing a short circuit within the cell. This type of construction increases the useful life of the condenser to a considerable extent since all during the time that the positive plates remain attached to their supporting members, no portion of the plates is in contact with the insulators. Hence, there is no area on the surface of the plate which is not free to heal up and restore itself to its normal efficiency after being attacked by corrosion.

A clearer understanding of this invention may be had by reference to the accompanying drawing in which Fig. 1 is a plan view of the condenser with the cover removed; Fig. 2 is a front view taken along line 2—2 of Fig. 1; and Fig. 3 is a side view taken along line 3—3 of Fig. 1.

Referring to the drawing there is shown an insulating jar 10 over which a cover 11 of insulating material is placed to prevent the evaporation of the electrolyte with which the jar is filled, the joint between the cover and the jar being rendered air-tight by a gasket 12. In the positive electrode assembly as shown, a T-shaped metallic conducting plate 13 is secured to cover 11 by means of studs 14, 15 and 16, stud 16 extending through the cover and forming a terminal to which a conducting wire may be attached. Positive electrode plates 17, 18, 19 and 20 which are preferably made of corrugated film forming material such as tantalum are suspended in spaced relation in the electrolyte from plate 13 by means of U-shaped supporting members 21, 22, 23 and 24 which are secured as by spot welding to one end of the positive plates respectively and by similar U-shaped supporting members which are secured in like manner to the other end of the electrode plates. These U-shaped members are fastened to plate 13 by rivets 25—32 thus completing a conducting path from the positive electrode plates through the U-shaped supporting members and plate 13 to stud 16, which serves as a terminal.

In the negative plate assembly plates 33—37 which are preferably made from sheet lead are placed adjacent the positive plates and are held in spaced relation and electrically coupled together at one end by means of metallic strips of conducting metal 38 and 39 and at the other end by similar strips 40 and 41. Metallic supporting members 42 and 43 which are secured, as by riveting, to strips 40 and 41 and a similar supporting member 44 which is connected in like manner to strips 38 and 39 serve to suspend the negative electrode assembly in the electrolyte from the studs 45, 46 and 47, studs 45 and 46 being embedded in the cover and stud 47 passing through and forming a terminal to which a conducting wire may be attached. U-shaped spacing members 48, 49, 50 and 51 are attached to strip 38 and similar U-shaped members are attached to the remaining strips 39, 40 and 41. These members are made from any suitable insulating material, for example, porcelain, and are so designed that they are out of contact with the adjacent electrodes when the electrodes are in their normal position.

During the operation of this device the portions of the positive plates 17, 18, 19 and 20 which are immersed in the electrolyte are subject to corrosion which results in a deposit of granular substance on the bottom of the cell. This corrosion does not seriously affect the electrical properties of the condenser since such corroded areas have a tendency to heal up and restore the plates to their normal efficiency. The deposit of granular material on the bottom of the cell, however, soon accumulates to the extent that it forces the plates together thereby causing a short circuit within the cell. This is prevented by increasing the strength of the corrugated positive plates 17, 18, 19 and 20, as for example, by increasing the thickness of the plate.

The U-shaped supporting members, to which the positive plates are attached, do not have this tendency to heal up where they emerge from the electrolyte. Hence in a relatively short period of time these members become corroded to the extent that the plates attached thereto ordinarily drop into the cell and cause short circuits by coming into contact with the negative plates. When the U-shaped insulated spacing members are attached to the negative plate assembly as shown in Fig. 1, a plate, when it drops from its support, falls against one of these U-shaped members and is thereby maintained in a semi-vertical position and out of contact with the next adjacent negative plate. This arrangement increases the useful life of the condenser to a considerable extent since during the time that the positive plates remain attached to the supporting members no portion of the plates is in contact with the insulators, hence there is no area on the surface of the plate which is not free to heal up and restore itself to its normal efficiency after being attacked by corrosion.

What is claimed is:

1. An electrolytic cell comprising a plurality of positive electrodes and a plurality of negative electrodes immersed in an electrolyte, means for supporting said electrodes in alternate side-by-side relation, and means comprising a plurality of insulating spacing members in engagement with said negative electrodes and normally out of engagement with adjacent positive electrodes, said means being so arranged as to prevent contact between adjacent electrodes upon failure of the supporting means for said positive electrodes.

2. An electrolytic cell comprising a plurality of positive electrodes and a plurality of negative electrodes immersed in an electrolyte, means for supporting said electrodes in alternate side-by-side relation, and a plurality of U-shaped insulating spacing members normally out of engagement with said positive electrodes and so arranged as to form guides therefor to prevent contact between adjacent positive and negative electrodes upon failure of the supporting means for said positive electrodes.

3. In an electrolytic cell comprising a container a plurality of positive electrodes and a plurality of negative electrodes immersed in an electrolyte within said container, metallic supporting means for said positive electrodes, metallic supporting means for said negative electrodes, means comprising a plurality of insulating members supported by said metallic supporting members for said negative electrodes and so arranged as to serve as auxiliary spacing members for said positive electrodes when they become misaligned.

4. In an electrolytic cell comprising a plurality of positive and a plurality of negative plates immersed in an electrolyte alternately in side-by-side spaced relationship, a plurality of insulating auxiliary spacing members for said plates placed between pairs of negative plates and adjacent the positive plates positioned between said negative plates, said auxiliary spacing members being normally out of contact with said positive plates but in contact with said positive plates when said plates are displaced from their normal positions.

5. In an electrolytic cell, comprising a plurality of positive electrode plates and a plurality of negative electrode plates immersed in an electrolyte, means for supporting said electrodes in alternate side-by-side relation, and means comprising a plurality of insulating members fixed between pairs of negative plates and normally out of contact with adjacent positive plates and in a position to support any positive plate upon failure of the supporting means for said plate.

6. In an electrolytic condenser, a plurality of positive electrodes held in a vertical plane in parallel spaced relationship by metallic spacing means, auxiliary positive electrode spacing means comprising a plurality of U-shaped insulators positioned out of contact with said positive electrodes during the normal operation of the condenser and in contact with said electrodes when the electrodes move out of said vertical plane.

HUMPHREYS O. SIEGMUND.